United States Patent Office 3,050,534
Patented Aug. 21, 1962

3,050,534
7-CYANO STEROIDS
Albert Bowers and Howard J. Ringold, Mexico City, Mexico, assignors, by mesne assignments, to Syntex Corporation, a corporation of Panama
No Drawing. Filed Aug. 13, 1959, Ser. No. 833,387
Claims priority, application Mexico Aug. 13, 1958
37 Claims. (Cl. 260—397.3)

This invention relates to certain new cyclopentanophenanthrene derivatives and to a process for the production of the same.

More particularly, it relates to new steroid compounds pertaining to the pregnane series and more particularly to the series of progestational and cortical hormones which are characterized by a cyano group in either the alpha or the beta steric configuration at C–7 in the B-ring of the steroid molecule.

These novel compounds therefore have the following general formulae; and in the second case more particularly the corticoid general formula:

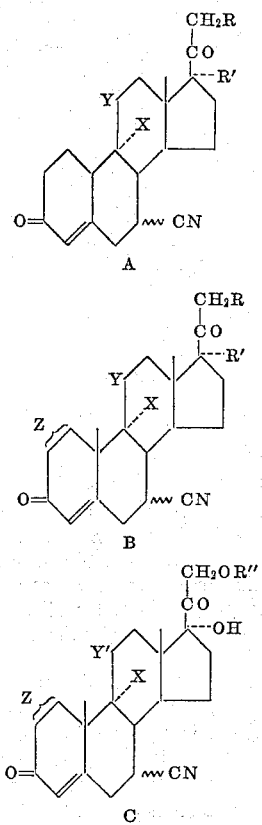

in which R is a member of the group consisting of hydrogen, hydroxyl and acyloxy —OR″, X is a member of the group consisting of hydrogen or fluorine, Y is an arrangement selected from the group consisting of

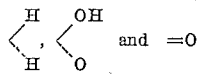 and =O

Y′ is either

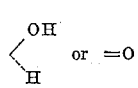 or =O

R′ is a member of the group consisting of hydrogen, the hydroxyl group and acyloxy —OR″, the acyl radical in the aforesaid acyloxy groups OR″ being R″ derived from hydrocarbon carboxylic acids having up to about 12 carbon atoms; Z is selected from the group consisting of the single and the double carbon-to-carbon bond, and CN is a member of the group consisting of —CN and ... CN. The R″ radical in ... OR″ at C–17α can be identical with that at C–21 in the side chain, or it can be a different acyl radical. The aforesaid hydrocarbon carboxylic acids from which R″ is derived, can be of up to about 12 carbon atoms, saturated or unsaturated, of straight, branched, cyclic or mixed cyclic-aliphatic chain, optionally substituted with functional groups such as hydroxyl. O-acyl (of 1 to about 12 carbon atoms), alkoxy (of 1 to 5 carbon atoms) or halogen (F, Cl or Br). Typical 21-esters or 17,21-diesters are, among others, the acetate, propionate, butyrate, hemisuccinate, enanthate caproate, benzoate, trimethylacetate, phenoxyacetate, phenylpropionate, cyclopentylpropionate and β-chloropropionate.

New compounds according to the invention in the pregnane series are represented by the above general Formula B and comprise such 7-cyano pregnane derivatives as the 7α and 7β-isomers of 7-cyano-progesterone, 7-cyano-17α-hydroxyprogesterone, 7 - cyano - 17α - hydroxy - 1 - dehydroprogesterone, 7 - cyano - desoxycorticosterone, 7-cyano-1-dehydro-corticosterone, of the 11-keto, 11β-hydroxy, 9α-fluoro-11-keto and 9α-fluoro-11β-hydroxy derivatives of all of the aforementioned compounds, as well as of 7-cyano-Δ⁴-pregnen-17α,21-diol-3,20-dione and 7 - cyano - Δ¹,⁴ - pregnadien - 17α,21 - diol - 3,20-dione. Our application also comprises the 19-nor derivatives of all of the Δ⁴-3-ketones mentioned among the above compounds as shown by the general Formula A. The hydroxyl groups at one or both of the positions C–17 and C–21 may be esterified.

Of the new compounds, the 7-cyano-progesterones and 7-cyano-17α-hydroxy- and 17α,21-dihydroxy hormones (Formula B), particularly under the form of their esters, are potent progestational hormones having anti-estrogenic and anti-androgenic activity; the 7-cyano-desoxycorticosterones (7-cyano-cortexones) also exhibit anti-estrogenic and anti-androgenic activity. Furthermore, all of the compounds comprised in our invention, especially those having hydroxyl groups at C–17 and/or C–21 or an oxygen function at C–11, are valuable intermediates for the preparation of 7-cyano cortical hormones.

The novel 7-cyano steroidal cortical hormones represented by the above general Formula C of the new compounds according to the invention comprise, more specifically, the 7α and 7β-isomers of 7-cyanocortisone, 7-cyano-cortisol, 7-cyano-prednisone and 7-cyano-prednisolone, which may further have a fluorine atom at C–9α and/or may have the hydroxyl group at C–21 under the esterified form. These new compounds which are the object of the present invention, are cortical hormones having a marked anti-inflammatory, glycogenic, thymolytic, eosinopenic, catabolic, anti-androgenic and anti-estrogenic activity.

These several series of new compounds according to our invention are produced by a process using as starting materials steroidal 6-dehydro compounds having the general formulas:

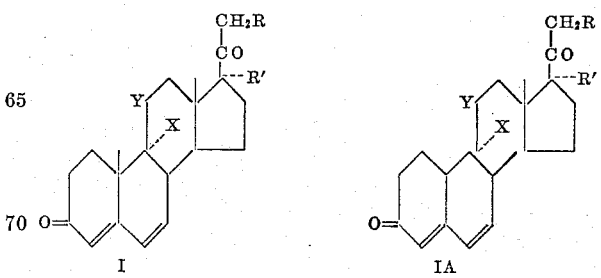

in which R, R', X, and Y have the same meaning as in the general formula of the final products given hereinbefore. This process can be illustrated summary by the following reaction equations of Reaction Diagram I for starting compounds I and the corresponding 19-nor analogs IA respectively:

REACTION DIAGRAM I

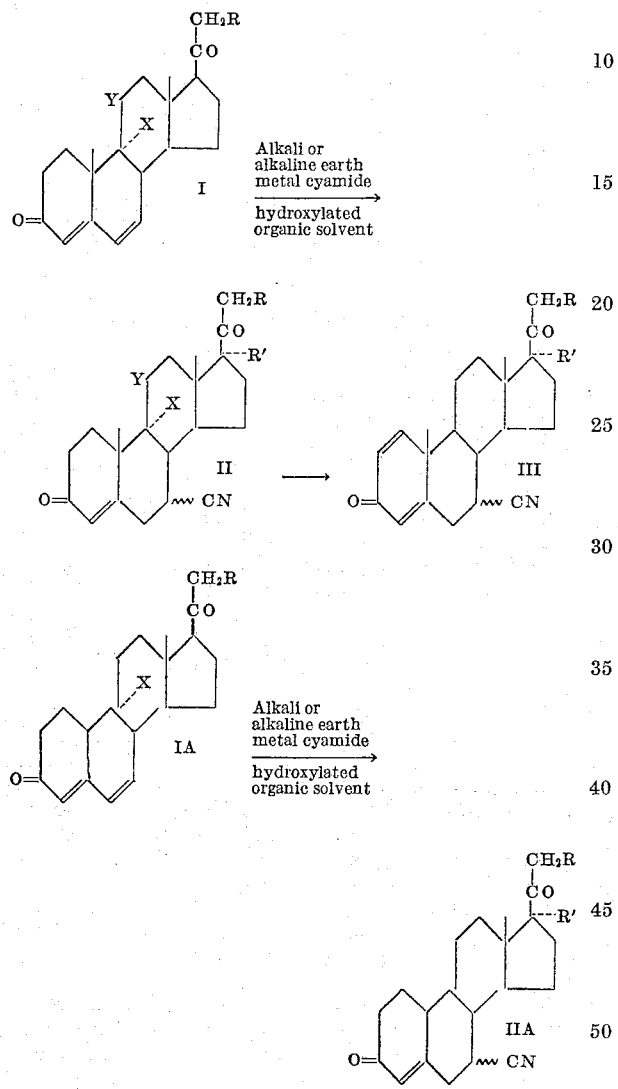

and comprises the introduction of a cyano group at C–7 by refluxing the starting compound with a cyamide ion donator preferably in the form of an alkali metal or alkaline earth metal cyamide in an organic hydroxylated solvent. In the progestational and corticoid series, the resulting 7-cyano analogs II can be further dehydrogenated to obtain the corresponding $\Delta^{1,4}$-analogs III.

The 6-dehydro starting compounds having the above general Formulas I and IA are obtained from the corresponding $\Delta^4$-3-ketones by applying known methods for dehydrogenation at C–6; thus, in the compounds of the 10-methyl series (I) we introduced the double bond at C–6,7 by refluxing with chloranil in mixture with xylene (cf. Agnello and Laubach, J. Am. Chem. Soc., 79, 1257 (1957)) or in mixture with ethyl acetate and acetic acid; in the 19-nor-$\Delta^4$-3-ketones (IA) we introduced the double bond at C–6,7 by formation of their 3-enol-ethers followed by reaction with hypobromous acid and dehydrobromination of the resulting 6β-bromo-19-nor-$\Delta^4$-3-ketones (cf. Bowers, Casas, Zderic and Djerassi, patent application Serial No. 806,763, filed on April 16, 1959).

Depending on the nature of the arrangement of substituents at the side chain and at C–17α in the starting material, we proceed:

(1) directly with the introduction of a cyano group at C–7 by the above described treatment when the side chain is —CO—CH$_3$ and R' is hydrogen or hydroxyl (I, I');

(2) in the case that the arrangement at C–17 is

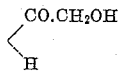

it is necessary first to protect the 17α,21-diol functions by forming the corresponding 17,20;20,21-bis-methylene-ether, then proceed to introduce the 7-cyano group as described above, and finally reforming the side chain by hydrolyzing the tetrahydropyranyl ether in a conventional manner;

(3) if the arrangement at C–17 is

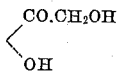

it is necessary first to protect the 17α,21-diol functions by forming the corresponding 17,20;20,21-bis-methylene-dioxy (BMD) derivatives then introducing the cyano group with C–7 as described under (1), and finally reforming the initial arrangement A' at C–17.

The temporary protection of the dihydroxyacetone side chain can also be achieved by monoketalization of the keto group at C–20.

These modes of carrying out the process of producing the new compounds according to the invention are illustrated in more detail in the following Reaction Diagram II, in which X and Y have the same meaning as explained hereinbefore, E designates either hydrogen or the methyl group, and Ac is acetyl.

REACTION DIAGRAM II

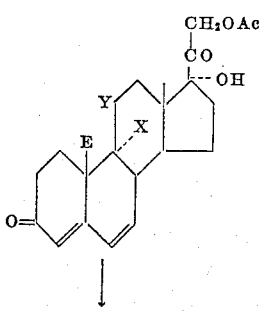

REACTION DIAGRAM II—Continued

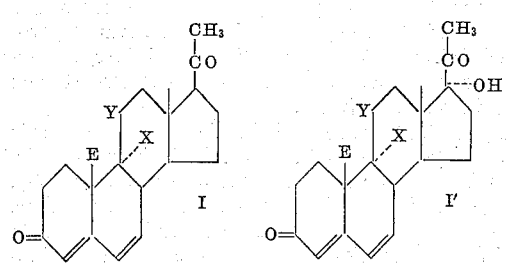
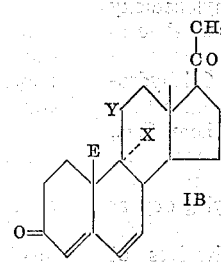
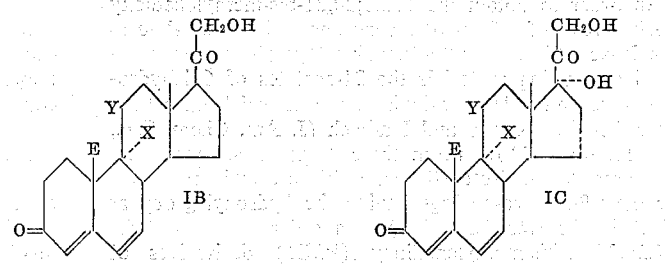

refluxed with an excess of potassium cyanide in 95% ethanol and a mixture of the respective 7α and 7β-cyano-$\Delta^4$-compounds IIA or IIA' is obtained; the isomers are then separated by chromatography. For introducing an additional double bond at C-1 of the 7-cyano-$\Delta^4$-compounds of the 10-methyl series, we reflux the isomers in mixture or after separation with selenium dioxide in mixture with t-butanol, in the presence of catalytic amounts of pyridine and under an atmosphere of nitrogen.

When starting from $\Delta^{4,6}$-pregnadiene-17α,21-diol-3,20-dione, namely the 6-dehydroderivatives of cortexolone (Reichstein's Compound "S") in either the 10-methyl or the 19-nor series (IC), we protected the dihydroxyacetone side chain by formation of its 17,20;20,21-bis-methylenedioxy derivative before effecting the reaction with the cyanide. After the introduction of the cyano group the bis-methylenedioxy group was hydrolyzed (for the formation of the 17,20;20,21-bis-methylenedioxy (BMD) compounds and their hydrolysis, see Sarrett et al., J. Am. Chem. Soc., 80, 1517 (1958)).

By the reaction with potassium cyanide we obtained a mixture of the 7α and 7β-isomers of the 7-cyano-$\Delta^4$-3-ketones, which were separated by chromatography; in the BMD compounds the bis-methylenedioxy group was then hydrolyzed. Thus there were obtained: the 7α and 7β isomers of 7-cyano-progesterone, 7-cyano-17α-hydroxy-progesterone and 7-cyano-cortexone(desoxycorticosterone) as well as the compounds substituted at C-11 or C-11 and C-9, according to the respective starting compounds, and of 7-cyano-$\Delta^4$-pregnene-17α,21-diol-3,20- dione. Starting from the corresponding 19-nor-$\Delta^{4,6}$-dienes, we obtained the respective 19-nor-7-cyano compounds.

In order to obtain the 17,20;20,21-bis-methylenedioxy derivatives of 6-dehydro-cortisone, 6-dehydro-hydrocortisone and of their 9α-fluoro-analogs (IC′) there were used as starting materials the 21-acetates of 6-dehydro-cortisone and 6-dehydro-hydrocortisone which have been described by Agnello and Laubach (J. Am. Chem. Soc., 79, 1257 (1957)). From these 21-acetates, there were prepared 6-dehydro-cortisone, 6-dehydro-hydrocortisone, or their 9α-fluoro-analogs having the hydroxyl group at C-21 in the free form (IC). In order to prepare the 17,20;20,21-bis-methylenedioxy (BMD) derivatives of the aforesaid free 6-dehydro compounds, there was followed the method described recently by Sarrett et al. (J. Am. Chem. Soc., 80, 1517 (1958)).

The compounds of Formula IC′ were treated with the cyanide of an alkali or alkali-earth metal in a hydroxylated solvent; for example, they were refluxed with an excess of potassium cyanide in mixture with absolute ethanol for 1-3 hours. Thus we produced a mixture of the BMD derivatives of the 7α and 7β-isomers of the 7-cyano analogs of cortisone, hydrocortisone, 9α-fluoro-cortisone and 9α-fluoro-hydrocortisone, respectively IC″. By chromatography, for example on washed alumina, we separated the stereoisomers and obtained 7α-cyano-cortisone, 7α-cyano-hydrocortisone, 7α-cyano-9α-fluoro-cortisone and 7α-cyano-9α-fluoro-hydrocortisone, as well as the 7β-isomers of such compounds, respectively, under the form of their BMD derivatives. Upon acid treatment, for example by heating with aqueous formic acid, there was regenerated the dihydroxyacetone side chain and thus we obtained 7α-cyano-cortisone, 7α-cyano-hydrocortisone, 7α-cyano-9α-fluoro-cortisone and 7α-cyano-9α-fluoro-hydrocortisone, as well as the 7β-isomers of such compounds, respectively IIc.

Usually we first regenerated the dihydroxyacetone side chain from the mixture of the 7α and 7β isomers of Ic′ and then isolated the stereoisomers by chromatography, to produce the aforementioned compounds of formula IIc.

While the process of the present invention essentially involved the introduction of the cyano group at C-7 into the 6-dehydro-derivatives (I), of the compounds which are going to be subjected to such introduction, those resulting $\Delta^4$-cyano compounds II which belong to the 10-methyl series, can subsequently be dehydrogenated at C-1 to produce the respective 7-cyano-1,4-dienes III in the Reaction Diagram I above.

Or the free 17β-hydroxyl group or the 21-hydroxyl group and, if present, the 17α-hydroxyl group of the above compounds II can be esterified by conventional methods with the radicals of any of the acids specified above, and esterification can then be followed by introduction of a further double bond at C-1. Or the free hydroxyl groups of compounds III may be esterified in the aforesaid manner, as illustrated in the following Reaction Diagram III:

REACTION DIAGRAM III

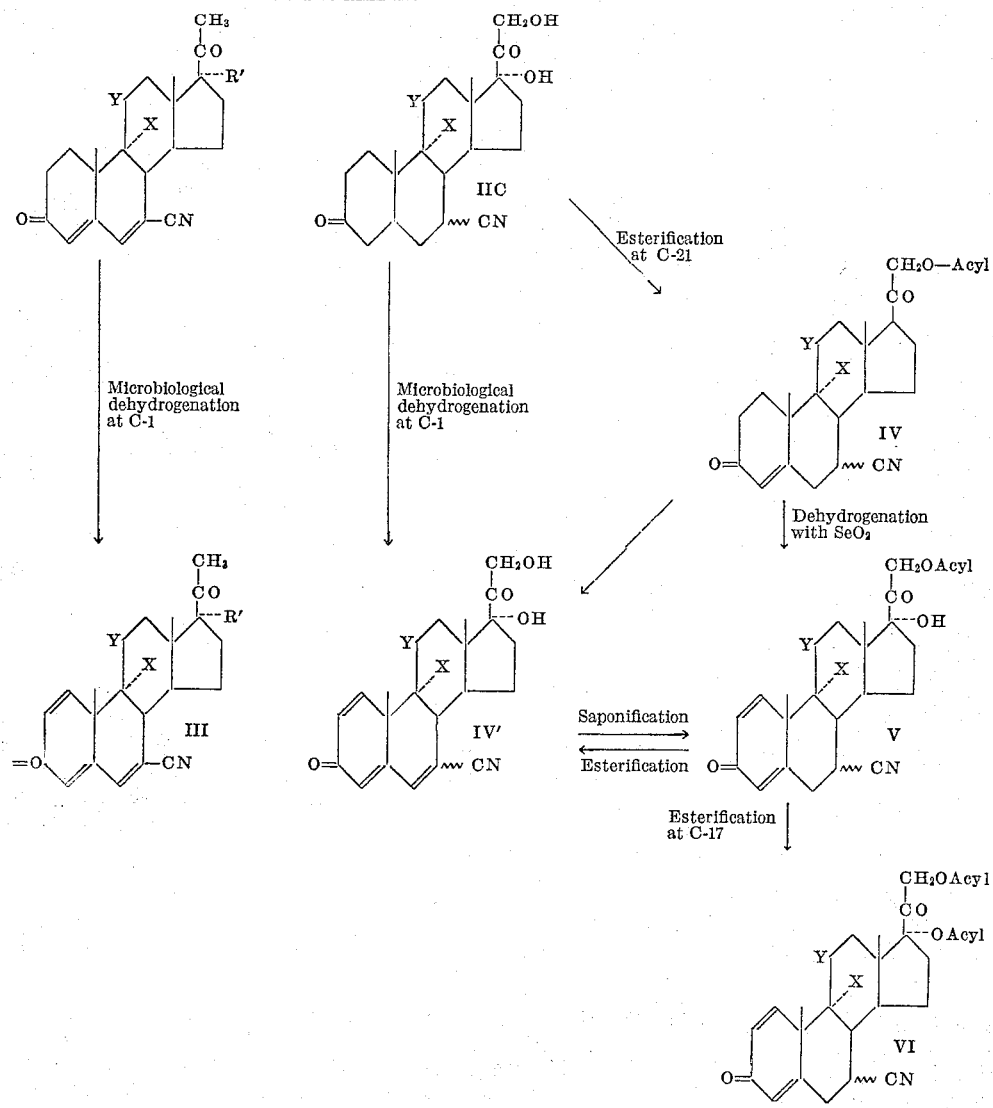

The aforementioned reactions can be modified within wide limits; thus, in the step of introduction of the cyano group, instead of ethanol there can be used another hydroxylated organic solvent such as methanol, or aqueous ethanol or aqueous methanol; since this reaction involves the addition of the elements of hydrogen cyanide to the C-6 double bond, there can be employed any other reagent capable of generating hydrogen cyanide, such as sodium cyanide or the cyanide of an alkaline earth metal.

For introducing as additional double bond into the 7-cyano-$\Delta^4$-3-ketones of the 10-methyl series, the compounds were refluxed with selenium dioxide in mixture with t-butanol, in the presence of catalytic amounts of pyridine and under an atmosphere of nitrogen; in the compounds hydroxylated at C-21 the 21-hydroxyl group was previously protected by esterification. Thus we obtained the $7\alpha$ and $7\beta$-cyano derivatives of the aforementioned compounds of the 10-methyl series having an additional double bond at C-1,2; in particular the progesterone 7-cyano derivatives listed above. Among these are the $7\alpha$ and $7\beta$ isomers of 7-cyano-1-dehydro-progesterone, 7-cyano-1-dehydro-17$\alpha$-hydroxyprogesterone, of 21-esters of 7-cyano-1-dehydro-desoxycorticosterone, of the corresponding 11-keto(or $\beta$-hydroxy) and 11-keto(or $\beta$-hydroxy-9$\alpha$-fluoro-compounds, as well as the $7\alpha$ and $7\beta$ isomers of 21-esters, preferably the acetate, of $\Delta^{1,4}$-pregnadiene-17$\alpha$,21-dione.

The ester group at C-21 of all of the 21-esters of the 7-cyano compounds was hydrolyzed and the hydroxyl groups which might be present at one or both of the positions C-17 and C-21 were reesterified; for effecting these operations we employed conventional methods which for clarity are described in some examples.

The 21-hydroxyl group of the compounds of Formula IIc was esterified by reaction with an excess of the anhydride of a carboxylic acid of up to 12 carbon atoms, in pyridine solution, to produce their 21-esters IV.

In another mode of carrying out the process for producing the $\Delta^{1,4}$ steroidal 7-cyano derivatives according to the invention, the respective 7-cyano compound of the 10-methyl series (in the case of the alcohols preferably under the free form) for instance, the 21-hydroxy compounds IIc were incubated with cultures of Corynebacterium simplex ATCC 6946 or of Septomia ATCC 6737, although there can be used other species of microorganisms. For this microbiological dehydrogenation one can also start from a 21-ester of the steroid (IV) obtained as mentioned above, since these methods involve the simultaneous hydrolysis of the ester group at C-21; in any case the resulting product is the respective 21-hydroxy-7-cyano-$\Delta^{1,4}$-compound III', that is, for example, one of the following important compounds: $7\alpha$-cyano-prednisone, $7\alpha$-cyano-9$\alpha$-fluoro-prednisone, $7\alpha$-cyano-9$\alpha$-fluoro-prednisolone, as well as the $7\beta$-isomers of such compounds, respectively. By the aforementioned reaction with the anhydride of a carboxylic acid, in pyridine solution, there were obtained the corresponding 21-esters V.

We also obtained the esters of Formula V by dehydrogenation of the 21-esters of the 7-cyano-$\Delta^4$-compounds IV by refluxing with selenium dioxide, preferably in mixture with t-butanol, in the presence of catalytic amounts of pyridine and under an atmosphere of nitrogen.

By alkali treatment, for example with dilute methanolic potassium hydroxide or sodium methoxide solution at low temperature and under an atmosphere of nitrogen, there can be hydrolyzed the ester groups of IV and V; the 21-hydroxyl group can be re-esterified by the aforementioned method.

For the esterification at C-21 we employed the anhydrides of carboxylic acids of up to 12 carbon atoms, saturated or unsaturated, of straight, branched, cyclic or mixed cyclic-aliphatic chain, which acid may be substituted with groups such as methoxy, halogen or other groups; among other such esters we prepared the 21-acetates, propionates, t-butyrates, hemisuccinates, enanthates, caproates, benzoates, trimethylacetates, phenoxyacetates, cyclopentylpropionates, phenylpropionates and $\beta$-chloropropionates.

The cyano group at C-7 of the present novel compounds can be transformed into other groups. For example, it can be converted into a carboxyl group, which in turn can produce a methyl ester which can be reduced to the hydroxymethylene group.

The starting materials I and IA are well known in the steroid art; of those less frequently used, the $9\alpha$-fluoro-analogs of 11-keto-progesterone, 17$\alpha$-hydroxy-11-keto-progesterone, 11$\beta$-hydroxy-progesterone and 11$\beta$, 17$\alpha$-dihydroxy-progesterone were described by Fried et al. in J. Am. Chem. Soc. 77, page 1068 (1955). Of the nor-compounds 19-nor-cortexone (19-nor Desoxycorticosterone) was described by Sandoval et al. in J. Am. Chem. Soc. 77, page 148 (1955), 11$\beta$-hydroxy-19-nor-progesterone and 11-keto-19-nor-progesterone were described by Bowers et al. in "Tetrahedron" (1958), vol. 2, page 165, and 17$\alpha$-hydroxy-19-nor-progesterone by Zaffaroni et al. in J. Am. Chem. Soc. 76, page 6210 (1950). $9\alpha$-fluoro-11$\beta$-hydroxy-19-nor-progesterone and $9\alpha$-fluoro-11-keto-19-nor-progesterone are described in patent application Serial No. 760,053, filed September 10, 1958, now abandoned.

The following preparations and examples will further illustrate the invention without, however, limiting its scope:

*Preparation I*

A mixture of 5 g. of $9\alpha$-fluoro-cortisone 21-acetate prepared as described by Fried et al. in U.S. Patent 2,852,511 and by the same authors in "Recent Progress in Hormone Research" vol. XI (1955) p. 168 et seq., 3 g. of chloranil and 200 cc. of xylene was refluxed for 12 hours, cooled and diluted with ether. The solution was washed with water, 5% sodium carbonate solution and again with water to neutral, dried over anhydrous sodium sulfate and evaporated to dryness, finally under vacuum. By chromatography of the residue on ethyl acetate washed alumina there was obtained $9\alpha$-fluoro-$\Delta^{4,6}$-pregnadiene-17$\alpha$,21-diol-3,11,20-trione 21-acetate, that is, $9\alpha$-fluoro-6-dehydro-cortisone 21-acetate.

A suspension of 3 g. of the above compound in 30 cc. of absolute methanol was treated with a 30 cc. of a solution of sodium methoxide in methanol prepared from 180 mg. of sodium metal, and the mixture was stirred for 1 hour at 0° C. under an atmosphere of nitrogen. The mixture was then poured into aqueous saturated sodium chloride solution containing 0.5 cc. of acetic acid and the precipitate was collected by filtration, washed with water, dried and recrystallized from acetone-hexane. There was thus obtained the free $9\alpha$-fluoro-6-dehydrocortisone.

*Preparation II*

By following the method of the previous preparation, there was introduced an additional double bond between C-6 and C-7 of $9\alpha$-fluoro-cortisol 21-acetate and the acetate group was then hydrolyzed yielding the free $9\alpha$-fluoro-6-dehydro-cortisol (cortisol=hydroctisone).

*Preparation III*

By the reaction with sodium methoxide described in Preparation I, the known 21-acetates of 6-dehydro-cortisone and 6-dehydrohydrocortisone were converted into the respective free alcohol.

*Preparation IV*

A mixture of 10 g. of 17$\alpha$-hydroxy-progesterone, 16 gms. of chloranil and 200 cc. of xylene was refluxed for 12 hours, cooled and diluted with ether. The solution was washed with water, 5% sodium carbonate solution and again with water to neutral, dried over anhydrous sodium sulfate and evaporated to dryness, finally under vacuum. Chromatography of the residue on ethyl acetate-washed alumina yielded 6-dehydro-17α-hydroxy-progesterone.

*Preparation V*

Applying the procedure of the preceding preparation to 17α-hydroxy-19-nor-progesterone produced as described by Zaffaroni et al. in J. Am. Chem. Soc. 76, page 6210 (1950), there was obtained 17α-hydroxy-6-dehydro-19-nor-progesterone.

*Preparation VI*

Applying the procedure of the preceding Preparation IV to 9α-fluoro-11-keto-progesterone produced as described by Fried et al. in J. Am. Chem. Soc. 77, page 1068 (1955), there was obtained 6-dehydro-9α-fluoro-11-keto-progesterone.

*Preparation VII*

By applying the procedure described by Sondheimer et al. in J. Am. Chem. Soc. 75, page 1932 et seq., 1953, there is produced 6-dehydro-cortexone 21-acetate which is saponified in a conventional manner to obtain the free 6-dehydro-cortexone.

EXAMPLE I

A mixture of 2.5 g. of 6-dehydro-cortisol (prepared as described by Hershberg and co-workers in J. Am. Chem. Soc. 79, page 502 (1957)), 100 cc. of chloroform and 25 cc. of a 37% aqueous solution of formaldehyde was treated with 25 cc. of concentrated hydrochloric acid and stirred at room temperature for 48 hours. The chloroform layer was separated, washed with 5% aqueous sodium carbonate solution and then with water to neutral, dried over anhydrous sodium sulfate and the chloroform was evaporated. Recrystallization of the residue from acetone-hexane yielded 17,20;20,21-bis-methylene-dioxy $\Delta^{4,6}$-pregnadiene-3,11-dione, that is, the bismethylenedioxy derivative of hydrocortisone.

A mixture of 5 g. of 17,20;20,21-bis-methylenedioxy-$\Delta^{4,6}$-pregnadien-11β-ol-3-one (BMD derivative of 6-dehydro-hydrocortisone), 10 g. of potassium cyanide and 250 cc. of absolute ethanol was refluxed for 2½ hours, cooled and diluted with water. The product was extracted with ethyl acetate, washed with water, dried over anhydrous sodium sulfate and evaporated to dryness. There was thus obtained a mixture of the 7α- and 7β-isomers of 7-cyano-17,20;20,21 - bis - methylenedioxy-$\Delta^4$-pregnen-11β-ol-3-one in crude form, which can be separated into its components by chromatography.

The crude bis-methylenedioxy (BMD) derivative of the above 7-cyano-hydrocortisone was mixed with 500 cc. of 60% formic acid and heated on the steam bath for 20 minutes, cooled and diluted with aqueous saturated sodium chloride solution; the precipitate was collected, washed with a little cold water, dried and recrystallized from acetone-hexane. There was thus obtained a mixture of 7α-cyano-hydrocortisone and 7β-cyano-hydrocortisone. The stereoisomers were separated by chromatography on neutral alumina.

In each of 30 Erlenmeyer flasks of 125 cc. capacity there was placed 30 cc. of an aqueous medium of 1% yeast extract. The contents of each flask was inoculated with a culture of Corynebacterium simplex ATCC 6946, obtained by incubating an aqueous medium of 1% yeast extract with a suspension of such microorganism for 24 hours. The medium thus inoculated was stirred for 24 hours at 28° C. There was thus obtained the culture of Corynebacterium simplex which was used for the subsequent incubation with the steroid.

To each flask there was added 1 cc. of a 1% solution of 7α-cyano-hydrocortisone in ethanol, which solution had been prepared just before its use and in recently distilled ethanol. The mixtures were then incubated at 26° C. for 24 hours with continuous stirring; in other experiments the incubation period was extended up to 72 hours.

The contents of the flasks were combined and divided into 3 portions; each portion was extracted 5 times with 500 cc. portions of methylene chloride. The extracts were combined, washed with water, dried over anhydrous sodium sulfate and the methylene chloride was evaporated. The residue was purified by chromatography on neutral alumina. The fractions eluted with mixtures of benzene and ether were crystallized from ethyl acetate, thus yielding 7α-cyano-prednisolane.

EXAMPLE II

Free 9α-fluoro-6-dehydro-cortisone obtained as described in Preparation I was treated in the same manner as described for the corresponding cortisol derivative in Example I and was first transformed into its bis-methylenedioxy derivative, to produce the bis-methylenedioxy derivative of 9α-fluoro-6-dehydro-cortisone, then to 7α-cyanocortisone, and finally to 7α-cyano prednisone.

EXAMPLE III

By following the microbiological dehydrogenation method described in Example I, 7β-cyano-hydro-cortisone was incubated to produce 7β-cyano-prednisolone.

EXAMPLE IV

A culture of *Septomixa affinis* ATCC 6737 was prepared by inoculating an aqueous medium of 2% of peptone and 5% of corn syrup with a growing vegetating culture of such fungus in the same medium. It was then incubated for 24 hours at a temperature around 28° C. under continuous stirring.

To each lt. of the Streptomyxa culture thus obtained there was added 30 cc. of a 1% solution of 7α-cyano-hydrocortisone in recently distilled ethanol and prepared just before its use. The mixture was stirred for 24 hours with aeration at a temperature around 28° C.; in other experiments the incubation period was extended up to 72 hours.

The product was then extracted several times with methylene chloride and the extract was washed with water, dried over anhydrous sodium sulfate and concentrated to a small volume under reduced pressure. The residue was subjected to chromatography on neutral alumina, eluting with mixtures of benzene and ether. By recrystallization from ethyl acetate of the fractions thus obtained, there was produced 7α-cyano-prednisolone, identical with the one obtained in accordance with the method of Example I.

EXAMPLE V

By substituting in the method of the previous example the 7α-cyano-hydrocortisone by 7β-cyano-hydrocortisone there was obtained 7β-cyano-prednisolone, identical with that obtained in accordance with Example III.

EXAMPLE VI

A solution of 3 g. of 7α-cyano-hydrocortisone in 15 cc. of pyridine was treated with 3 cc. of acetic anhydride and the mixture was allowed to react overnight at room temperature. It was then poured into water, heated for half an hour on the steam bath, cooled and the precipitate was collected, washed with water, dried and recrystallized from acetone-hexane. There was thus obtained 7α-cyano-hydrocortisone 21-acetate.

A mixture of 3 g. of the above compound, 150 cc. of t-butanol, 1.2 g. of selenium dioxide and 1 cc. of pyridine was refluxed under an atmosphere of nitrogen for 48 hours, filtered through celite, washing the filter with a little hot ethyl acetate and the filtrate and washings were combined and evaporated to dryness under reduced pressure. The residue was dissolved in acetone, refluxed with charcoal for 1 hour, filtered and the acetone was evaporated. The residue was purified by chromatography on neutral alumina. By recrystallization of the solid eluates from acetone-hexane there was obtained 7α-cyano-prednisolone 21-acetate.

A suspension of 1 g. of the above compound in 10 cc.

of absolute methanol was cooled to 0° C., treated with a solution of sodium methoxide prepared by dissolving 60 mg. of sodium metal in 10 cc. of absolute methanol and the mixture was stirred at 0° C. for 1 hour; it was then poured into 100 cc. of aqueous saturated sodium chloride solution containing a few drops of acetic acid and the precipitate was collected, washed with water, dried and recrystallized from acetone-hexane. There was thus obtained 7α-cyano-prednisolone, identical with the one obtained in accordance with Examples I and IV.

EXAMPLE VII

By following the method of Example I, the BMD derivative of 6-dehydro-cortisone was treated with potassium cyanide to produce a mixture of the 7-stereoisomers of the BMD derivatives of 7-cyano-cortisone; then the dihydroxyacetone side chain was regenerated and the stereoisomers were separated by chromatography. By following the procedures described in the previous examples, there were then prepared the 7β-cyano-prednisone and its 21-acetate, respectively.

EXAMPLE VIII

By substituting in the method of Example I for the BMD derivative of 6-dehydro-hydrocortisone of the BMD derivative of 9α-fluoro-6-dehydro-cortisol obtained as described in Preparation II, there were prepared: 7α-cyano-9α-fluoro-cortisol, 7α-cyano-9α-fluoro-prednisolone, their 7β-isomers and the 21-acetates of the aforementioned 7-cyano-compounds.

EXAMPLE IX

By using in the method of Example I 9α-fluoro-6-dehydro-cortisone obtained as described in Preparation I as starting material, there were prepared: 7α-cyano-9α-fluoro-cortisone, 7α-cyano-9α-fluoroprednisone, their 7β-epimers, and the 21-acetate of the aforementioned 7-cyano compounds.

By following the method of acetylation described in Example VI, there was esterified the 21-hydroxyl group of the 7α and 7β-isomers of 7-cyano-hydrocortisone, of 7-cyano-cortisone, 7-cyano-prednislone and of 7-cyano-prednisone, as well as of the 9α-fluoro-analogs of such compounds, but using instead of acetic anhydride the anhydride of any other carboxylic acid of up to 12 carbon atoms. In the case of polycarboxylic acids there was used a larger quantity of the anhydride and the reaction time was extended to 48 hours.

In following this procedure of Example VI the final products listed in Table I below can be obtained from the indicated starting materials:

TABLE I

| Ex. No. | Free 7-Cyano-analog | Acid Anhydride | Final Product |
| --- | --- | --- | --- |
| X | 7α and 7β-cyano cortisol. | propionic anyhdride. | 21-propionate. |
| XI | 7α and 7β-cyano cortisone. | butyric anhydride. | 21-butyrate. |
| XII | 7α and 7β-cyano-9α-fluoro-cortisol. | enanthic anhydride. | 21-enanthate. |
| XIII | 7α and 7β-cyano-9α-fluoro-cortisone. | hemisuccinic anhydride. | 21-hemisuccinate. |
| XIV | 7α and 7β-cyano cortisol. | benzoic anhydride. | 21-benzoate. |
| XV | 7α and 7β-cyano cortisone. | caproic anhydride. | 21-caproate. |
| XVI | 7α and 7β-cyano 9α-fluoro-cortisol. | cyclopentyl-propionic anhydride. | 21-cyclopentyl-propionate. |

EXAMPLES XVII–XXIII

By dehydrogenation of the 21-esters of the 7-cyano-Δ⁴-compounds, by refluxing with selenium dioxide as described in Example VI, there were obtained the corresponding 21-esters of the 7-cyano-Δ¹,⁴-compounds, as listed below in Table II.

TABLE II

| Ex. No. | 7-cyano-Δ⁴-compound | 7-cyano-Δ¹,⁴-compound |
| --- | --- | --- |
| XVII | 7α-cyano-cortisol-21-propionate. | 7α-cyano-prednisolone-21-propionate. |
| XVIII | 7β-cyano-cortisone-21-butyrate. | 7β-cyano-prednisone-21-butyrate. |
| XIX | 7β-cyano-9α-fluoro-cortisol-21-enanthate. | 7β-cyano-9α-fluoro-prednisolone-21-nanthate. |
| XX | 7α-cyano-9α-fluoro-cortisone-21-hemisuccinate. | 7α-cyano-9α-fluoro-prednisone-21-hemisuccinate. |
| XXI | 7β-cyano-cortisol-21-benzoate. | 7β-cyano-prednisolone-21 benzoate. |
| XXII | 7α-cyano-cortisone-21-caproate. | 7α-cyano-prednisone-21-caproate. |
| XXIII | 7β-cyano-cortisone-21-cyclopentyl-propionate. | 7β-cyano-prednisone-21-cyclopentyl-propionate. |

EXAMPLE XXIV

My reaction of 7α-cyano-prednisolone-21-propionate, obtained according to Example XVII, with sodium methoxide, in accordance with Example VI, there was obtained the free 7α-cyano-prednisolone.

EXAMPLE XXV

By incubation of a mixture of the 21-butyrates of 7α- and 7β-cyano-cortisones, by following the procedure described in Example IV, there was obtained a mixture of the 7α and 7β-isomers of respective 7-cyano-prednisones having the hydroxyl group at C–21 under the free form.

EXAMPLE XXVI

A mixture of 5 g. of 6-dehydro-progesterone, obtained as described by Wettstein in Helv. Chim. Acta. 23, p. 388 (1940), 10 g. of potassium cyanide and 250 cc. of 95% ethanol was refluxed for 150 minutes, concentrated to a small volume and diluted with water. The product was extracted with ethyl acetate and the extract was washed with water, dried over anhydrous sodium sulfate and evaporated to dryness. By chromatography of the residue on neutral alumina there were obtained 7α-cyano-progesterone and 7β-cyano-progesterone.

EXAMPLE XXVII

By applying the method described in Example XXVI to 5 g. of 17α-hydroxy-6-dehydro-progesterone obtained as described in Preparation IV there were produced 7α-cyano-17α-hydroxy-progesterone and 7β - cyano - 17α-hydroxy-progesterone.

EXAMPLE XXVIII

By applying the method of Example XXVI to 5 g. of 17α-hydroxy-19-nor-6-dehydro-progesterone produced according to Preparation V there were obtained 7α-cyano-17α-hydroxy - 19 - nor-progesterone and 7β-cyano-17α-hydroxy-19-nor-progesterone.

EXAMPLE XXIX

By applying the method of XXVI to 5 g. of 11-keto-9α-fluoro-6 - dehydro-progesterone produced according to Preparation VI there were obtained 7α-cyano-11-keto-9α-fluoro-progesterone and 7β-cyano - 11 - keto-9α-fluoro-progesterone.

EXAMPLE XXX

A mixture of 5 g. of 6-dehydro-cortexone (cortexone-desoxycorticosterone) obtained as described in Preparation VII, 60 cc. of dry benzene, 6 cc. of dihydropyrane and 120 mg. of p-toluenesulfonic acid was kept at room temperature for 20 hours and then poured into aqueous saturated sodium bicarbonate solution; the organic phase was separated, washed with water, dried over anhydrous sodium sulfate and evaporated to dryness, thus producing the 21-(2′-tetrahydropyranyl)-ether of 6-dehydro-cortexone.

In accordance with the method described in Example XXVI, 5 g. of the above compound was treated with potassium cyanide to form the 21-(2′-tetrahydropyranyl)- ether of 7α-cyano-cortexone and of 7β-cyano-cortexone, respectively.

The ether group of the above compounds was hydrolyzed in the usual manner by treatment in acetone solution with small amounts of concentrated hydrochloric acid; the mixture was then diluted with water and the product was extracted with ethyl acetate and purified by recrystallization from acetone-hexane.

EXAMPLE XXXI

A mixture of 5 g. of 6-dehydro-cortexolone ($\Delta^{4,6}$-pregnadiene-17α,21-diol-3,20-dione), prepared by conventional saponification of the 21-acetate thereof obtained as described by Sondheimer et al. in J. Am. Chem. Soc. 75, pages 5932 et seq. (1953), 150 cc. of chloroform, 50 cc. of 37% aqueous formaldehyde solution and 50 cc. of concentrated hydrochloric acid was stirred at room temperature for 48 hours. The chloroform layer was separated, washed with 5% aqueous sodium carbonate solution and water, dried over anhydrous sodium sulfate and evaporated to dryness. Recrystallization of the residue from acetone-hexane afforded 17,20;20,21-bis-methylenedioxy-$\Delta^{4,6}$-pregnadien-3-one.

A solution of 3 g. of the above compound in 95% ethanol was treated with potassium cyanide and the product was worked up in accordance with the method described in Example I. The crude product was mixed with 300 cc. of 60% formic acid and heated on the steam bath for 20 minutes, cooled, diluted with aqueous saturated sodium chloride solution and the precipitate formed was collected by filtration, washed with water and dried. By chromatography on neutral alumina there were obtained 7α-cyano-$\Delta^4$-pregnene-17α,21-diol-3,20-dione and 7β-cyano-$\Delta^4$-pregnene-17α,21-diol-3,20-dione.

EXAMPLE XXXII

A mixture of 2 g. of 7-cyano-progesterone (Example I), prepared as described in Example XXVI, 100 cc. of t-butanol, 250 mg. of selenium dioxide and a few drops of pyridine was refluxed under an atmosphere of nitrogen for 48 hours, filtered through celite and evaporated to dryness. The residue was dissolved in acetone, treated with decolorizing charcoal, refluxed for 1 hour, filtered and again evaporated to dryness. By chromatography of the residue on neutral alumina there was obtained 7α-cyano-1-dehydro-progesterone.

EXAMPLE XXXIII

By following the procedure of the previous example, 3 g. of 7β-cyano-17α-hydroxy-progesterone (Example 2) was converted into 7β-cyano-17α-hydroxy-1-dehydroprogesterone.

EXAMPLE XXXIV

A solution of 3 g. of 7α-cyano-cortexone, obtained as described in Example XXX, in 10 cc. of pyridine and 3 cc. of acetic anhydride was kept for 4 hours at room temperature, poured into water, heated for half an hour on the steam bath, cooled and the precipitate was collected by filtration, washed with water, dried and recrystallized from acetone-hexane. There was thus obtained 7α-cyano-cortexone 21-acetate.

2 g. of the above compound was refluxed with selenium dioxide, as described in Example 7, to produce 7α-cyano-1-dehydro-cortexone 21-acetate.

A mixture of 1 g. of the above compound and 50 cc. of a 1% methanolic solution of potassium hydroxide was kept at 0° C. under an atmosphere of nitrogen for 1 hour; it was then poured into 200 cc. of cold sodium chloride solution containing 1 cc. of acetic acid and the precipitate was collected, washed with water, dried and recrystallized from acetone-hexane, thus yielding the free 7α-cyano-1-dehydro-cortexone.

A mixture of 500 mg. of the above compound, 5 cc. of pyridine and 2 cc. of benzoic anhydride was kept overnight at room temperature; after pouring into 100 cc. of water the mixture was heated for 2 hours on the steam bath, cooled and the precipitate was collected, washed with water, dried and recrystallized from acetone-hexane, thus furnishing 7α-cyano-1-dehydro-cortexone 21-benzoate.

EXAMPLE XXXV

A mixture of 2 g. of 7α-cyano-cortexolone (7α-cyano-$\Delta^4$-pregnene-17α,21-diol-3,20-dione) prepared as described in Example XXXI, 10 cc. of pyridine and 4 g. of cyclopentylpropionic anhydride was kept for 48 hours at room temperature, poured into water, heated for 2 hours on the steam bath, cooled and the precipitate was collected, washed with water, dried and recrystallized from acetone-hexane. There was thus obtained 7α-cyano-cortexolone 21-cyclopentylpropionate.

By reaction of 1 g. of the above compound with selenium dioxide, in accordance with the procedure described in Example XXXII, there was obtained the corresponding 21-ester of 7α-cyano-1-dehydro-cortexolone, i.e., 7α-cyano-$\Delta^{1,4}$-pregnadiene-17α,21-diol-3,20-dione 21-cyclopentylpropionate.

A solution of 500 mg. of the above compound and 500 mg. of p-toluenesulfonic acid in a mixture of 15 cc. of acetic acid and 3 cc. of acetic anhydride was kept overnight under an atmosphere of nitrogen; after pouring into water the mixture was heated for half an hour on the steam bath, cooled and the precipitate was collected, washed with water, dried and recrystallized from acetone-hexane. There was thus obtained 7α-cyano-$\Delta^{1,4}$-pregnadiene-17α,21-diol-3,20-dione-17-acetate-21-cyclopentylpropionate.

EXAMPLE XXXVI

A mixture of 1 g. of 7α-cyano-17α-hydroxy-19-norprogesterone prepared as described in Example XXVIII, 100 cc. of anhydrous benzene, 3 g. of caproic anhydride and 200 mg. of p-toluenesulfonic acid monohydrate was kept at room temperature for 3 days and then diluted with water. The benzene layer was separated, washed with 5% sodium carbonate solution and water, dried over anhydrous sodium sulfate and the benzene was evaporated. By chromatography of the residue on neutral alumina there was obtained 7α-cyano-17α-hydroxy-19-norprogesterone caproate.

We claim:

1. A new steroid compound having the general formula:

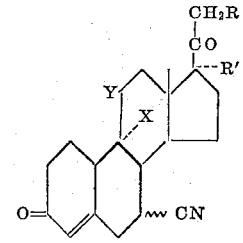

in which R and R′ are members of the group consisting of hydrogen, hydroxyl, and acyloxy OR″, R″ is an acyl radical derived from a hydrocarbon carboxylic acid having up to about 12 carbon atoms, X is a member of the group consisting of hydrogen and fluorine, Y is an arrangement selected from the group consisting of

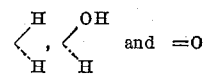

and ᴡCN represents a cyano radical selected from the group consisting of 7α-cyano and 7β-cyano.

2. A new steroid compound having the general formula:

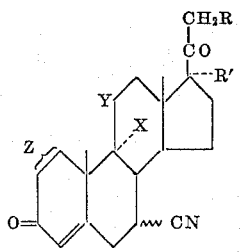

in which R and R' are members of the group consisting of hydrogen, hydroxyl, and acyloxy OR", R" is an acyl radical derived from a hydrocarbon carboxylic acid having up to about 12 carbon atoms, X is a member of the group consisting of hydrogen and fluorine, Y is an arrangement selected from the group consisting of

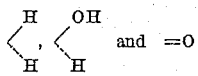

and ⁓CN represents a cyano radical selected from the group consisting of 7α-cyano and 7β-cyano, and in which Z designates a C-1-to-C-2 linkage selected from the group consisting of C—C and C=C.
3. 7-cyano cortisone.
4. 7-cyano cortisol.
5. 7-cyano prednisone.
6. 7-cyano prednisolone.
7. A steroid as described in claim 2, wherein X is fluorine and Y is =O.
8. A steroid as described in claim 2, wherein X is fluorine and Y is

9. A steroid as described in claim 7, wherein Z is a double bond.
10. A steroid as described in claim 8, wherein Z is a double bond.
11. 7-cyano progesterone.
12. 7-cyano-17α-hydroxy-progesterone.
13. 7-cyano-cortexone.
14. 7-cyano-cortexolone.
15. 7-cyano-19-nor-progesterone.
16. 7-cyano-19-nor-17α-hydroxy-progesterone.
17. 7-cyano-19-nor-cortexone.
18. 7-cyano-19-nor-cortexolone.
19. 7-cyano-1-dehydro-progesterone.
20. 7-cyano-17α-hydroxy-1-dehydro-progesterone.
21. 7-cyano-1-dehydro-cortexone.
22. 7-cyano-1-dehydro-cortexolone.
23. In a process for producing 7-cyano steroids, the step of refluxing a starting 6-dehydro-steroid selected from the group consisting of compounds having the general formula

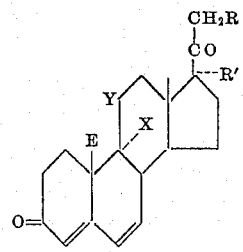

in which R and R' are members of the group consisting of hydrogen, hydroxyl, and acyloxy OR", R" being an acyl radical derived from a hydrocarbon carboxylic acid having up to about 12 carbon atoms, X is a member of the group consisting of hydrogen and fluorine, Y is an arrangement selected from the group consisting of

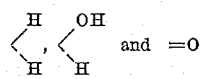

and E is selected from the group consisting of hydrogen and methyl, and their 17,20;20,21-bis-methylenedioxy derivatives with an excess of a cyanide salt selected from the group consisting of alkali metal cyanides and alkaline earth metal cyanides in solution in a hydroxylated organic solvent.
24. The process step described in claim 23, in which the cyanide salt is potassium cyanide dissolved in 95% ethanol.
25. A 21-mono hydrocarbon carboxylic acid ester of up to 12 carbon atoms of 7-cyano cortisone.
26. A 21-mono hydrocarbon carboxylic acid ester of up to 12 carbon atoms of 7-cyano cortisol.
27. A 21-mono hydrocarbon carboxylic acid ester of up to 12 carbon atoms of 7-cyano prednisone.
28. A 21-mono hydrocarbon carboxylic acid ester of up to 12 carbon atoms of 7-cyano prednisolone.
29. A hydrocarbon carboxylic acid ester of up to 12 carbon atoms of 7-cyano-17α-hydroxy-progesterone.
30. A hydrocarbon carboxylic acid ester of up to 12 carbon atoms of 7-cyano-cortexone.
31. A hydrocarbon carboxylic acid ester of up to 12 carbon atoms of 7-cyano-cortexolone.
32. A hydrocarbon carboxylic acid ester of up to 12 carbon atoms of 7-cyano-19-nor-17α-hydroxy-progesterone.
33. A hydrocarbon carboxylic acid ester of up to 12 carbon atoms of 7-cyano-19-nor-cortexone.
34. A hydrocarbon carboxylic acid ester of up to 12 carbon atoms of 7-cyano-19-nor-cortexolone.
35. A hydrocarbon carboxylic acid ester of up to 12 carbon atoms of 7-cyano-17α-hydroxy-1-dehydro-progesterone.
36. A hydrocarbon carboxylic acid ester of up to 12 carbon atoms of 7-cyano-1-dehydro-cortexone.
37. A hydrocarbon carboxylic acid ester of up to 12 carbon atoms of 7-cyano-1-dehydro-cortexolone.

References Cited in the file of this patent
UNITED STATES PATENTS

| | | |
|---|---|---|
| 2,841,531 | Wettstein et al. | July 1, 1958 |
| 2,888,457 | Beyler et al. | May 26, 1959 |
| 2,897,218 | Sebech et al. | July 28, 1959 |
| 2,907,694 | Agnello et al. | Oct. 6, 1959 |